May 20, 1941.   C. H. TRAVER   2,242,931
DRAFT DEFLECTOR
Filed April 26, 1937
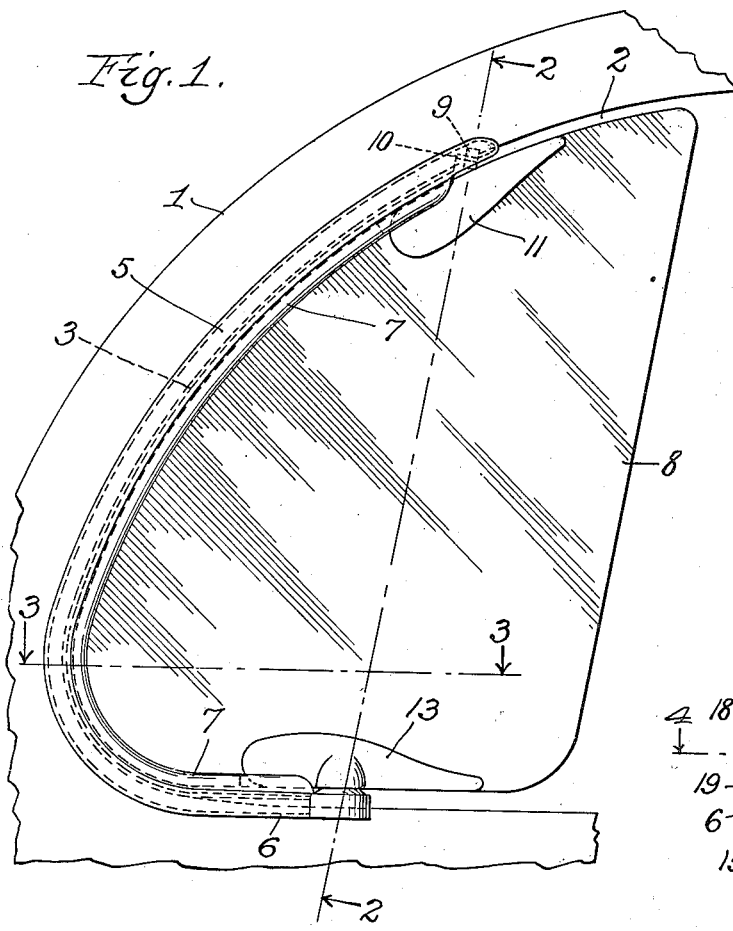
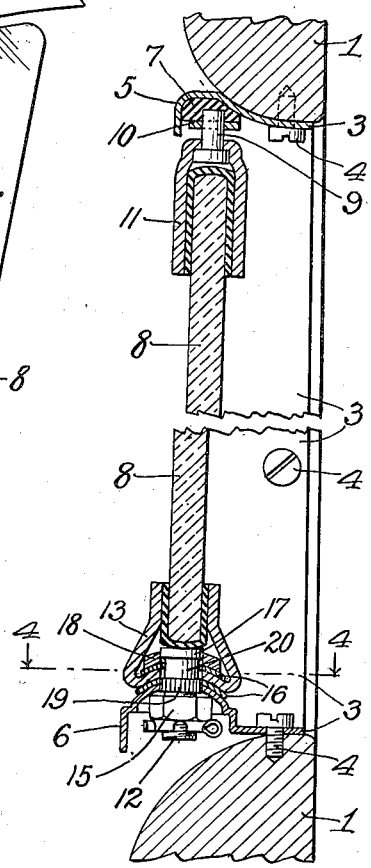
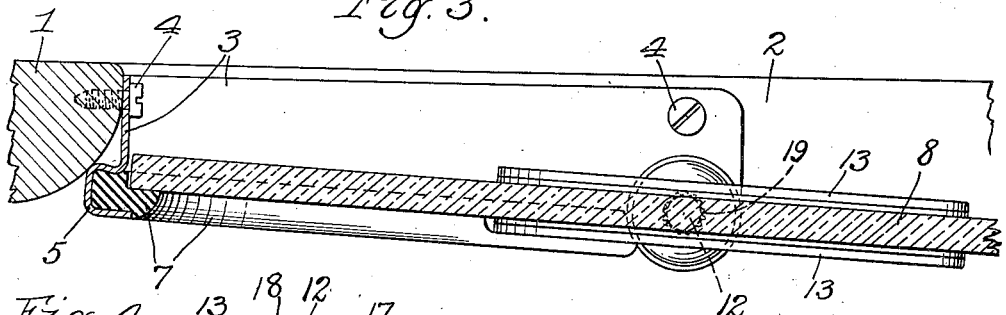
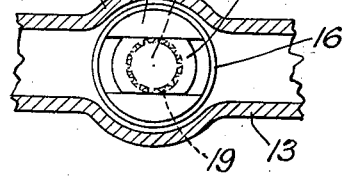
Inventor
Clarence H. Traver
by Parker & Carter
Attorneys Patented May 20, 1941

2,242,931

UNITED STATES PATENT OFFICE 2,242,931

DRAFT DEFLECTOR

Clarence H. Traver, Chicago, Ill., assignor to The Dole Valve Company, Chicago, Ill., a corporation of Illinois Application April 26, 1937, Serial No. 138,872

1 Claim. (Cl. 296—84)

This invention relates to draft deflectors and has for its object to provide a new and improved device of this description. The invention has as a further object to provide a draft deflector adapted to be positioned between the reveals of the automobile. The invention has as a further object to provide a draft deflector forming a unitary structure and adapted to be easily and quickly attached to the automobile. The invention has as a further object to provide a draft deflector having a metallic member extending along a portion of the front and bottom thereof, to which the glass is pivoted, said member being provided with a recess and a sealing member in said recess and projecting therefrom, which is engaged by the pivoted member when in its closed position. The invention has other objects which are more particularly pointed out in the accompanying description.

Referring now to the drawing,

Fig. 1 is a side elevation of a portion of the front of an automobile, with the draft deflector in position;

Fig. 2 is a sectional view taken on line 2—2 of Fig. 1;

Fig. 3 is a sectional view taken on line 3—3 of Fig. 1; and

Fig. 4 is a top plan view of the lower pivot with the glass engaging member shown in section at the line 4—4 on Fig. 2.

Like numerals refer to like parts throughout the several figures.

Referring now to the drawing, I have illustrated at 1 the front portion of an automobile having a window 2. Mounted in the window is a stationary deflector support having a portion 3, attached to the reveal of the window by attaching devices, 4, and a portion 5 which extends along the reveal of the window and which is attached to and preferably integral with the portion 3. This portion 5 is provided with an angled portion 6 which extends along the bottom of the window. The portions 5 and 6 of the deflector supporting member are provided with a recess or groove and in this recess or groove there is a sealing member 7, preferably of rubber, which sealing member preferably projects inwardly toward the deflector glass 8. The deflector glass 8 is provided with an upper pivot 9 which fits into a socket 10 in the stationary deflector support. This socket 10 may be formed in any desired manner. For purposes of illustration, I have shown it as being formed by bending, or otherwise forming, a portion of the part 5 to bring it in proper position to receive the pivot. The end of the pivot preferably fits into a receiving opening in the sealing member 7. This pivot is attached to a glass engaging member 11, attached to the glass.

The lower pivot 12 is associated with the glass engaging member 13 into which the edge of the glass is received. The pivot 12 is non-rotating and is held against rotation in any desired manner. To secure this result, the pivot 12 is provided with teeth 19 where it passes through the opening in the portion 6 of the stationary deflector support, said portion 6 being also provided with corresponding teeth between which the teeth 19 fit. It is these teeth that hold the pivot against rotation when the glass 8 is moved.

This pivot 12 is preferably a friction pivot and may be provided with one or more friction members 16 which are brought into frictional engagement with the member 13 and the stationary part 6 by tightening the nut 15. Any other means for resisting the pivotal movement of the glass may be used.

The pivot 12 is provided with an enlarged end or head 17 engaging a member 18 in the glass engaging member 13, so as to prevent the pivot from being pulled through when the nut 15 is tightened.

The portion 20 of the pivot which passes through the opening in the glass engaging member 13 is preferably smaller in diameter than the toothed portions and smaller in diameter than the opening in the glass engaging member 13 through which it passes, so that the deflector glass moves about the portion 20 when it is moved to any of its various positions and is held in any of its various positions by the friction members 16.

It will thus be seen that the pivots of the glass are a part of the device and that the device is made up as a unit and is easily and quickly attached to the window of the automobile by means of the attaching devices 4. It will thus be seen that the device may be completely made up at the factory and all that is necessary is to send it to the point of use and fasten it in position on the automobile by the fastening devices 4. Any other suitable means may be used to fasten it in position. When the device is in use, the glass 8 may be moved to various angular positions about its pivotal axis, so as to provide an opening between the glass and the stationary deflector support, through which air may pass.

The head 17 has flattened sides, shown in Fig. 4, so that it may be inserted through the opening in the part 18 when the pivot is being placed in position, and then turned so as to be held against removal.

I claim:

A draft deflector for automobiles comprising a glass, a metallic member extending along a portion of the front and the bottom of said glass and to which the glass is pivoted, said metallic member having an inwardly extending portion extending inwardly beyond the pivotal points of the glass and engaging the reveal of the automobile window, and fastening means at one side of the glass for fastening said inwardly extending portion in position, the pivotal points of the glass being within the vertical plane of the outer wall of the window frame, said metallic member having a free exposed surface on the outside face thereof, said metallic member and glass forming a unitary structure separate from the automobile, which may be attached to and removed from the automobile as a unit.

CLARENCE H. TRAVER.